G. G. LOBDELL.
Car Wheel.
No. { 463; 31,467. }    Patented Feb. 19, 1861.
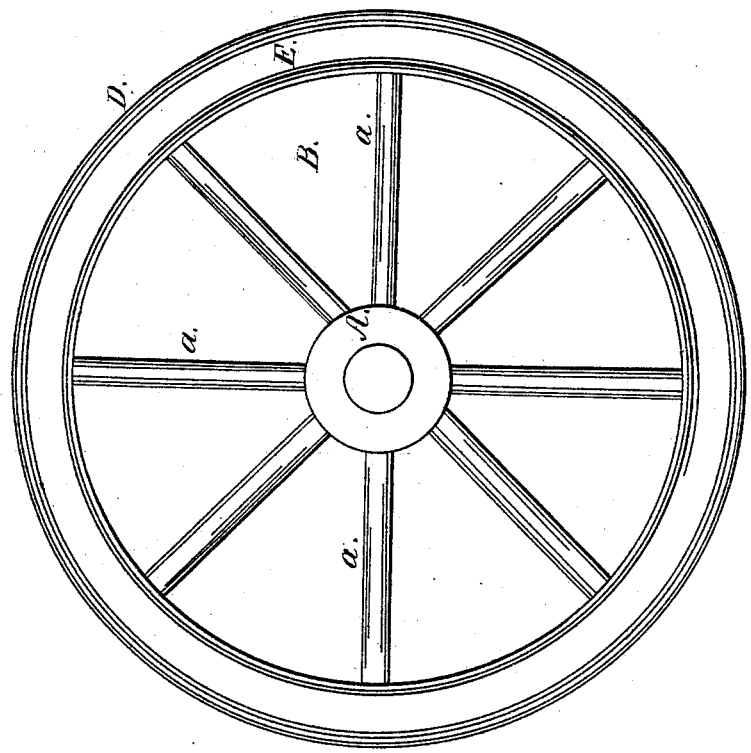
Witnesses:
J. W. Coombs.
R. S. Spencer.
Inventor:
G. G. Lobdell
per Munn & Co.
Attorneys

UNITED STATES PATENT OFFICE.

GEORGE G. LOBDELL, OF WILMINGTON, DELAWARE.

RAILWAY-CAR WHEEL.

Specification of Letters Patent No. 31,467, dated February 19, 1861.

*To all whom it may concern:*

Be it known that I, GEORGE G. LOBDELL, of Wilmington, in the county of Newcastle and State of Delaware, have invented a new and useful Improvement in the Construction of Railroad-Car Wheels; and I do hereby declare that the following is a full, clear, and exact description of the same, reference being had to the annexed drawings, making a part of this specification, in which—

Figure 1 is a face view of the inner side of a car wheel constructed according to my invention. Fig. 2, a central section of the same, the plane of section bisecting the axis of the wheel longitudinally.

Similar letters of reference indicate corresponding parts in the two figures.

This invention relates to an improvement in what are generally termed "single-plate wheels" and consists in having a continuous rib on the inner diameter of the rim of the wheel directly opposite or in line with the flanch, said rib being used with braces to connect it to the plate.

The object of the invention is to increase the strength of the rim of the wheel, the part most requiring strength, without materially increasing its weight and consequently without affecting injuriously the wear of the tread, the latter contingency being due to an increased weight of metal which prevents the sudden chilling of the tread and therefore a proper degree of hardness.

To enable those skilled in the art to fully understand and construct my invention I will proceed to describe it.

A, represents the hub of the wheel, B the plate, and C, the rim with a flanch D, at its inner edge. The hub A, is, or may be, of the usual form and therefore does not require any special description. The plate B, also may be of any of the known forms, but I prefer a double-arched-plate as shown clearly in Fig. 2. This plate I shall not here describe as it forms the subject matter of another specification. The rim C, is of the usual form, that is, at its tread or outer surface and so is the flanch D. The inner side or periphery of the rim has the essential addition of a rib E, which is simply a projection of semi-circular or an approximate form in its transverse section as shown in Fig. 2, and extends all around the rim as shown in Fig. 1. This rib E, is in the same plane with the flanch D, and a space is left all around the inner side of the rim C, between the flanch D, and plate B, and in this space there are braces *a*, at suitable distances apart, and these braces may extend down the inner side of the plate D, to the hub A.

The plate B, is connected with the rim C, at a point near its outer edge as shown clearly in Fig. 2.

The hub, plate and rim, are all cast in one piece.

From the above description it will be seen that the rim C, will quickly cool after the wheel is cast, as the former may be quite thin, the rib E, giving the rim the requisite degree of strength as it is at the precise point to effect such result while it does not increase the thickness of the rim so as to appreciably affect the proper chilling of the same. The same may also be said of plate B, in consequence of being connected or made to join the rim C, near its outer edge.

The braces *a*, serve to strengthen the rim without appreciably adding to its weight, and the rim therefore while being strengthened by the braces will not have its tread affected by an imperfect chill.

I do not claim broadly the use of a rib to strengthen or support the tread, but,

Having thus described my invention what I claim as new and desire to secure by Letters Patent, is:

In single plate wheels the construction of the flanch D, with an inner rib E, arranged and employed in relation to the said flanch and the remaining portions of the wheel in the manner and for the purposes herein described.

GEORGE G. LOBDELL.

Witnesses:
 JOHN MILLS,
 WM. B. WIGGINS.